(12) United States Patent
Negishi et al.

(10) Patent No.: US 7,610,605 B2
(45) Date of Patent: Oct. 27, 2009

(54) METHOD AND APPARATUS FOR CONVERSION AND DISTRIBUTION OF DATA UTILIZING TRICK-PLAY REQUESTS AND META-DATA INFORMATION

(75) Inventors: Shinji Negishi, Kanagawa (JP); Hideki Koyanagi, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 09/878,282

(22) Filed: Jun. 12, 2001

(65) Prior Publication Data

US 2002/0016970 A1 Feb. 7, 2002

(30) Foreign Application Priority Data

Jun. 14, 2000 (JP) .............. P2000-179001

(51) Int. Cl.
*H04N 7/173* (2006.01)
*H04N 5/783* (2006.01)
*H04N 5/76* (2006.01)

(52) U.S. Cl. .............. 725/94; 725/88; 725/90; 725/102; 386/68

(58) Field of Classification Search ............. 725/88–90, 725/102, 94; 386/68
See application file for complete search history.

(56) References Cited

U.S. PATENT DOCUMENTS

| 5,341,474 | A  | * | 8/1994  | Gelman et al. ............... 725/94 |
| 5,659,539 | A  | * | 8/1997  | Porter et al. ................. 709/231 |
| 5,740,307 | A  | * | 4/1998  | Lane .......................... 386/68 |
| 5,742,347 | A  | * | 4/1998  | Kandlur et al. ......... 375/240.25 |
| 6,065,050 | A  | * | 5/2000  | DeMoney ................... 709/219 |
| 6,119,154 | A  | * | 9/2000  | Weaver et al. ............... 709/219 |
| 6,434,748 | B1 | * | 8/2002  | Shen et al. ................... 725/89 |
| 6,445,738 | B1 | * | 9/2002  | Zdepski et al. ......... 375/240.01 |
| 6,510,551 | B1 | * | 1/2003  | Miller ........................ 717/114 |
| 6,965,724 | B1 | * | 11/2005 | Boccon-Gibod et al. ...... 386/68 |
| 7,023,992 | B1 | * | 4/2006  | Kubota et al. ............... 380/210 |

FOREIGN PATENT DOCUMENTS

JP          09-162830          6/1997

* cited by examiner

*Primary Examiner*—Christopher Kelley
*Assistant Examiner*—Reuben M Brown
(74) *Attorney, Agent, or Firm*—Rader, Fishman & Grauer PLLC

(57) ABSTRACT

A data distribution system includes a server apparatus and a decoding terminal. In the server apparatus, the access unit information of data to be transmitted is read from a data storage unit in accordance with a trick play request. The access unit information is converted for a trick play in a data conversion unit. The data to be transmitted is converted in a multiplexing unit into trick play data in accordance with the access unit information having been converted. Then, the trick play data is transmitted from the server apparatus to the decoding terminal.

9 Claims, 16 Drawing Sheets

DTS(n) : DECODING TIME OF ACCESS UNIT (n)
Sn : SIZE OF ACCESS UNIT (n)
vbv-delay (n) : VBV DELAY OF ACCESS UNIT (n)
Br1, Br2 : REPEAT PICTURES

FIG. 4

| | SIZE | DECODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| m-1 | $S_{m-1}$ | $DTS_{m-1}$ | $PTS_{m-1}$ | vbv_delay(m-1) | P | 0 |
| m | $S_m$ | $DTS_m$ | | vbv_delay(m) | B | 0 |
| m+1 | $S_{m+1}$ | $DTS_{m+1}$ | | vbv_delay(m+1) | B | 0 |
| m+2 | $S_{m+2}$ | $DTS_{m+2}$ | $PTS_{m+2}$ | vbv_delay(m+2) | P | 0 |
| ... | ... | ... | ... | ... | ... | ... |
| n-1 | $S_{n-1}$ | $DTS_{n-1}$ | | vbv_delay(n-1) | B | 0 |
| n | $S_n$ | $DTS_n$ | $PTS_n$ | vbv_delay(n) | I | 1 |
| n+1 | $S_{n+1}$ | $DTS_{n+1}$ | | vbv_delay(n+1) | B | 0 |
| ... | ... | ... | ... | ... | ... | ... |

FIG. 5

| | SIZE | DECODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| m-1 | $S_{m-1}$ | $DTS_{m-1}$ | $PTS_{m-1}$ | vbv_delay(m-1) | P | 0 |
| r1 | $S_{r1}$ | $DTS_m$ | | vbv_delay(r1) | B | 0 |
| r2 | $S_{r2}$ | $DTS_{m+1}$ | | vbv_delay(r2) | B | 0 |
| n | $S_n$ | $DTS_{m+2}$ | $PTS_{m+2}$ | vbv_delay(n) | I | 1 |
| n+1 | $S_{n+1}$ | $DTS_{m+3}$ | | vbv_delay(n+1) | B | 0 |
| ... | ... | ... | ... | ... | ... | ... |

| | SIZE | DE-CODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| n-1 | $S_{n-1}$ | $DTS_{n-1}$ | | vbv_delay(n-1) | B | 0 |
| n | $S_n$ | $DTS_n$ | $PTS_n$ | vbv_delay(n) | I | 0 |
| n+1 | $S_{n+1}$ | $DTS_{n+1}$ | | vbv_delay(n+1) | B | 0 |
| n+2 | $S_{n+2}$ | $DTS_{n+2}$ | | vbv_delay(n+2) | B | 0 |
| ... | ... | ... | ... | ... | ... | ... |

(b)

| | SIZE | DE-CODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| n-1 | $S_{n-1}$ | $DTS_{n-1}$ | | vbv_delay(n-1) | B | 0 |
| n | $S_n$ | $DTS_n$ | $PTS_n$ | vbv_delay(n) | I | 0 |
| r1 | $S_{r1}$ | $DTS_{r1}$ | | vbv_delay(r1) | B | 0 |
| ... | ... | ... | ... | ... | ... | ... |
| ri | $S_{ri}$ | $DTS_{ri}$ | $PTS_{n+i}$ | vbv_delay(ri) | P | 0 |
| n+1 | $S_{n+1}$ | $DTS_{n+1}$ | | vbv_delay(n+1) | B | 0 |
| n+2 | $S_{n+2}$ | $DTS_{n+2}$ | | vbv_delay(n+2) | B | 0 |
| ... | ... | ... | ... | ... | ... | ... |

| | SIZE | DE-CODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| m-1 | $S_{m-1}$ | $DTS_{m-1}$ | $PTS_{m-1}$ | vbv_delay(m-1) | P | 0 |
| m | $S_m$ | $DTS_m$ | | vbv_delay(m) | B | 0 |
| m+1 | $S_{m+1}$ | $DTS_{m+1}$ | | vbv_delay(m+1) | B | 0 |
| m+2 | $S_{m+2}$ | $DTS_{m+2}$ | $PTS_{m+2}$ | vbv_delay(m+2) | P | 0 |
| ... | ... | ... | ... | ... | ... | ... |

(b)

| | SIZE | DE-CODING TIME | PRESEN-TATION TIME | VBV DELAY | PICTURE CODING TYPE | CLOSED GOP |
|---|---|---|---|---|---|---|
| ... | ... | ... | ... | ... | ... | ... |
| m-1 | $S_{m-1}$ | $DTS_{m-1}$ | $DTS_{m+5}$ | vbv_delay(m-1) | P | 0 |
| r1 | $S_{r1}$ | $DTS_m$ | | vbv_delay(r1) | B | 0 |
| m | $S_m$ | $DTS_{m+1}$ | | vbv_delay(m) | B | 0 |
| r2 | $S_{r2}$ | $DTS_{m+2}$ | | vbv_delay(r2) | B | 0 |
| m+1 | $S_{m+1}$ | $DTS_{m+3}$ | | vbv_delay(m+1) | B | 0 |
| r3 | $S_{r3}$ | $DTS_{m+4}$ | | vbv_delay(r3) | B | 0 |
| m+2 | $S_{m+2}$ | $DTS_{m+5}$ | $PTS_{m+5}$ | vbv_delay(m+2) | P | 0 |
| ... | ... | ... | ... | ... | ... | ... |

| | SIZE | DE-CODING TIME | PRESEN-TATION TIME | VBV DELAY | PICTURE CODING TYPE | CLOSED GOP |
|---|---|---|---|---|---|---|
| ... | ... | ... | | ... | ... | ... |
| m-2 | $S_{m-2}$ | $DTS_{m-2}$ | | vbv_delay(m-2) | B | 0 |
| m-1 | $S_{m-1}$ | $DTS_{m-1}$ | $PTS_{m-1}$ | vbv_delay(m-1) | I | 0 |
| m | $S_m$ | $DTS_m$ | | vbv_delay(m) | B | 0 |
| m+1 | $S_{m+1}$ | $DTS_{m+1}$ | | vbv_delay(m+1) | B | 0 |
| m+2 | $S_{m+2}$ | $DTS_{m+2}$ | $PTS_{m+2}$ | vbv_delay(m+2) | P | 0 |
| m+3 | $S_{m+3}$ | $DTS_{m+3}$ | | vbv_delay(m+3) | B | 0 |
| m+4 | $S_{m+4}$ | $DTS_{m+4}$ | | vbv_delay(m+4) | B | 0 |
| m+5 | $S_{m+5}$ | $DTS_{m+5}$ | $PTS_n$ | vbv_delay(m+5) | I | 1 |
| m+6 | $S_{m+6}$ | $DTS_{m+6}$ | | vbv_delay(m+6) | B | 0 |
| ... | ... | ... | | ... | ... | ... |

(b)

| | SIZE | DE-CODING TIME | PRESEN-TATION TIME | VBV DELAY | PICTURE CODING TYPE | CLOSED GOP |
|---|---|---|---|---|---|---|
| ... | ... | ... | | ... | ... | ... |
| m-2 | $S_{m-2}$ | $DTS_{m-2}$ | | vbv_delay(m-2) | B | 0 |
| m-1 | $S_{m-1}$ | $DTS_{m-1}$ | $PTS_{m-1}$ | vbv_delay(m-1) | I | 0 |
| r1 | $S_m$ | $DTS_m$ | | vbv_delay(m) | B | 0 |
| r2 | $S_{m+1}$ | $DTS_{m+1}$ | | vbv_delay(m+1) | B | 0 |
| m+2 | $S_{m+2}$ | $DTS_{m+2}$ | $PTS_{m+2}$ | vbv_delay(m+2) | P | 0 |
| r3 | $S_{m+3}$ | $DTS_{m+3}$ | | vbv_delay(m+3) | B | 0 |
| r4 | $S_{m+4}$ | $DTS_{m+4}$ | | vbv_delay(m+4) | B | 0 |
| m+5 | $S_{m+5}$ | $DTS_{m+5}$ | $PTS_{m+5}$ | vbv_delay(m+5) | I | 1 |
| m+6 | $S_{m+6}$ | $DTS_{m+6}$ | | vbv_delay(m+6) | B | 0 |
| ... | ... | ... | | ... | ... | ... |

METHOD AND APPARATUS FOR CONVERSION AND DISTRIBUTION OF DATA UTILIZING TRICK-PLAY REQUESTS AND META-DATA INFORMATION

BACKGROUND OF THE INVENTION

1. Field of the Invention

The present invention relates to data conversion apparatuses and methods, data distribution apparatuses and methods, and data distribution systems. More specifically, the present invention relates to a data conversion apparatus and method, a data distribution apparatus and method, and a data distribution system, in which multimedia data including video data, etc. is distributed via a network in such a manner that a trick play of the data is allowed on a receiver terminal.

2. Description of the Related Art

A conventional data distribution system is known in which multimedia data including, for example, video data and audio data are compressed and stored on a server apparatus, and the multimedia data is distributed from the server apparatus via a transmission medium to a decoding terminal on the receiving end, where the multimedia data is decoded for playing.

When the conventional data distribution system is used in a network at home, the video data is encoded in accordance with, for example, ISO/IEC 13818-2 (MPEG-2 Video). ISO/IEC 13818-2 dictates that the video data be encoded so as not to cause overflow or underflow of a decoder buffer conforming to MPEG-2 standards, which is called a VBV (Video Buffer Verifier) buffer.

More specifically, referring to FIG. 14, the video data must be encoded with reference to decode time stamps (DTS) so as not to cause overflow or underflow of the VBV buffer with considerations to the buffer size of the VBV buffer (vbv_buffer_size). The VBV buffer receives the video data at the transmission rate of the video data (reflected in the gradient of the line indicating the buffer occupancy) and outputs the video data at a decode timing specified by the DTS.

For example, the nth video frame (n) having a data size S(n) is removed from the VBV buffer at a decoding time DTS(n). The video data to be removed from the VBV buffer must have already been input to the VBV buffer before the decoding time thereof. The time between the beginning of the input of a video frame and the decoding time of the video frame is referred to as a VBV delay (vbv_delay), which is encoded in the header of data into which the video frame is encoded.

Methods of encoding video frames, provided by ISO/IEC 13818-2, include I-picture (intra picture) in which encoding is based only on data within a frame, B-picture (bidirectionally predictive picture) in which encoding employs inter-frame motion prediction, and P-picture (predictive picture). The presentation time of a B-picture is equal to the decoding time thereof. Meanwhile, the presentation time of an I-picture or a P-picture is equal to the decoding time of the next I-picture or P-picture so that the I-picture and the P-picture are allowed to be used for prediction.

Furthermore, in the conventional data distribution system, as video data for transmission, for example, elementary stream data is packetized using transport streams (TS) defined in ISO/IEC 13818-1 (MPEG-2 system), and time-multiplexed with other elementary stream data, etc. The unit of decoding in the elementary stream data, such as a video picture, is referred to as an access unit. Referring to FIG. 15, when TS is packetized, an elementary stream constituted of a plurality of access units (AU), shown in (a), is initially packetized into a packet structure called a PES packet, shown in (b). The header of the PBS packet may include encoded time information (i.e., decode time and presentation time) of the first access unit in the PES packet. The PBS packet is then packetized into a transport packet and time-multiplexed with other transport packets, whereby a single multiplexed stream is formed, as shown in (c). Stuffing data is inserted as required in order to align the first byte of the PES packet with the beginning of the payload of the transport packet.

Furthermore, in the conventional data distribution system, for example, as video data for transmission, video data is packetized using transport streams (TS) defined in ISO/IEC 13818-1 (MPEG-2 system), and multiplexed with other data, etc. ISO/IEC 13818-1 defines a decoder model, shown in FIG. 16, for decoding of TS.

Referring to FIG. 16, the decoder model includes a switching unit 101 for switchingly outputting TS which have been input, a transport buffer (TB) 102, a multiplexing buffer (MB) 103, an elementary buffer (EB) 104, a video decoder ($D_{Video}$) 105, a reordering buffer 106, and a switching unit 107. Video packets in the TS which have been input are selected by the switching unit 101 and input to the transport buffer 102 at the input rate, fed to the video decoder 105 via the buffers 102, 103, and 104, and are then output.

In the decoder model, the buffer size of each of the transport buffer 102, the multiplexing buffer 103, and the elementary buffer 104 are predetermined, and data transfer rates between each of the buffers are also defined.

In the decoder model, the elementary buffer 104 is equivalent to the VBV buffer for the video data. ISO/IEC 13818-1 dictates that the video data be packetized so as not to cause overflow or underflow of any of the buffers.

More specifically, in order to satisfy the decoder model and alignment restrictions in the multiplexed data, the server apparatus must determine a multiplexing schedule with reference to the size time information of access units. When the server apparatus converts the elementary stream data so as to allow trick play thereof, the size and time information of access units in the elementary stream data are changed. Thus, after the data is converted for trick play, a real-time processing is required for multiplexing.

As an example of the multiplexing apparatus, an authoring system which multiplexes a plurality of elementary streams to generate multiplexed data is disclosed in Japanese Unexamined Patent Application Publication No. 9-162830. The multiplexing apparatus includes an encoding unit which generates access unit information including access unit size and time information, so that a multiplexing schedule can be determined using the access unit information and without parsing the elementary streams themselves.

A data distribution system with a trick play capability includes, for example, a server apparatus 200 and a decoding terminal 300, as shown in FIG. 17.

Referring to FIG. 17, in the data distribution system, the server apparatus 200 includes a data storage unit 201, a trick play controlling unit 202 to which a trick play request signal is to be input, a data conversion unit 203 which generates trick play data based on a trick play control signal in accordance with the trick play request signal input from the trick play controlling unit 202, a multiplexing unit 204, and a transmitter unit 205. The decoding terminal 300 includes a receiver unit 301 for receiving transmission data from the server apparatus 200 via a transmission medium 400, and a decoding unit 302 for decoding the trick play data from the receiver unit 301 and presenting the decoded data on a display apparatus (not shown) for the user.

In the data distribution system, the data conversion unit 203 includes a decoder to which the trick play control signal from the trick play controlling unit 202 and video data from the data storage unit 201 is input, and an encoder which re-encodes the data decoded by the decoder.

The decoder, in accordance with the trick play control signal from the trick play controlling unit 202, reads designated video data from the data storage unit 201 by a most suitable method in accordance with the type of trick play. For example, if the trick play control signal specifies a fast-forward play as the type of trick play, the decoder reads the designated video data from the data storage unit 201 while skipping B-pictures not used for decoding.

The decoder decodes the video data which has been read, and supplies the decoded data to the encoder as a decoded video signal. The decoded video data reflects the way in which the video data has been read from the data storage unit 201; that is, the decoded video signal reflects the type of trick play.

The encoder encodes the decoded video signal from the decoder, and outputs the encoded data to the multiplexing unit 204 as trick play video data. Because the decoded video signal from the decoder reflects the type of trick play, the trick play video data is in accordance with the type of trick play. For example, if the video data is encoded in accordance with ISO/IEC 13818-2, the trick play data output from the encoder is in accordance with ISO/IEC 13818-2.

The multiplexing unit 204 needs to parse the trick play data and thereby retrieve data size and time information thereof in order to determine a multiplexing schedule which satisfies the decoder model and alignment restrictions of the multiplexed data.

When the server apparatus 200 transmits the trick play data for trick play, for example, a fast-forward play or a pause, via the transmission medium 400 to the decoding terminal 300, a trick play request signal from a user requesting a trick play is input to the trick play controlling unit 202. In response thereto, the data conversion unit 203 reads elementary stream data from the data storage unit 201, and converts the elementary stream data into trick play data in accordance with the trick play request signal. Thus, in order to allow the trick play, the server apparatus 200 needs to convert the elementary stream data and to perform the multiplexing of the elementary stream data by a real-time processing, not being allowed to store data to be multiplexed in the data storage unit 201.

Furthermore, the data conversion unit 203 re-encodes the video data by the decoder and the encoder, incurring a high processing load and possibly degrading the picture quality. In addition, because the processing delay relating to the data conversion is large, the delay between the input of the trick play request signal and the presentation of the contents of the trick play on the decoding terminal 300 increases.

Alternatively, the trick play data may be generated by changes on the bitstreams, without re-encoding by the decoder and the encoder. For example, in order to perform a pause as the type of trick play, repeat pictures, indicating no change from a previous picture, are inserted in an elementary stream for normal play. Repeat pictures in accordance with MPEG-2 Video are entirely constituted of skip macro blocks, indicating that a picture used for prediction be repeated. Because the data size of the repeat pictures is small, by adding stuffing data, requirements for the VBV buffer are satisfied.

When the trick play data in accordance with the trick play request is produced by the data conversion unit 203 converting the elementary stream data, the multiplexing unit 204, in order to determine a multiplexing schedule which satisfies the decoder model and alignment restrictions of multiplexed data, needs to parse the converted elementary stream data, i.e., the trick play data, to thereby retrieve the data size and time information thereof. Because the elementary stream data has been converted for the trick play, the multiplexing of the elementary stream data must be performed by a real-time processing. As the number of elementary streams to be multiplexed increases, such as video data, audio data, and caption data, the processing load of the multiplexing unit 204 for parsing the elementary stream data also increases. Furthermore, the multiplexing unit 204 also suffers an increased processing load as the resolution and/or the rate of video data increases.

Furthermore, when the elementary stream data is multiplexed a plural number of times by different combinations, the multiplexing unit 204 needs to parse the elementary stream data each time.

Furthermore, in the server apparatus 200, when the data conversion unit 203 converts the elementary stream data for normal play, the processing load of the data conversion unit 203 for the conversion and input/output considerably increases as the number and/or rate of the elementary streams increases, similarly to the multiplexing unit 204.

SUMMARY OF THE INVENTION

The present invention has been made in view of the above, and an object thereof is to provide a data conversion apparatus and method, a data distribution apparatus and method, and a data distribution system, in which normal play data is efficiently converted into trick play data.

To this end, the present invention, in one aspect thereof, provides a data conversion apparatus and method, wherein a trick play request is input by a user, meta-data associated with transmission data to be transmitted to a receiving end is read from a data storage unit in accordance with the trick play request, the meta-data is converted in accordance with a type of trick play specified in the trick play request, transmission data in accordance with the meta-data having been converted is read from the data storage unit, and the transmission data is converted into trick play data in accordance with the meta-data.

In accordance with the data conversion apparatus and method, instead of parsing the transmission data itself, the meta-data associated with the transmission data is converted and the transmission data is converted in accordance with the meta-data having been converted. Accordingly, the normal play data can be efficiently converted into the trick play data.

The present invention, in another aspect thereof, provides a data conversion apparatus and method, wherein elementary stream data is externally input, meta-data associated with the elementary stream data is retrieved from the elementary stream data, the elementary stream data and the meta-data is stored in a data storage unit, and in response to a trick play request input by a user, meta-data in accordance with the trick play request is read from the data storage unit, the meta-data is converted in accordance with a type of trick play specified in the trick play request, elementary stream data in accordance with the meta-data having been converted is read from the data storage unit, and the elementary stream data is converted into trick play data in accordance with the meta-data.

In accordance with the data conversion apparatus and method, instead of parsing the elementary stream data itself, the meta-data associated with the elementary stream data is converted and the elementary stream data is converted in accordance with the meta-data having been converted. Accordingly, the normal play data can be efficiently converted into the trick play data.

The present invention, in yet another aspect thereof, provides a data conversion apparatus and method, wherein a source signal is externally input, the source signal is encoded into elementary stream data, meta-data associated with the elementary stream data is generated, the elementary stream data and the meta-data is stored in a data storage unit, and in response to a trick play request input by a user, meta-data in accordance with the trick play request is read from the data storage unit, the meta-data is converted in accordance with a type of trick play specified in the trick play request, elementary stream data in accordance with the meta-data having been converted is read from the data storage unit, and the elementary stream data is converted into trick play data in accordance with the meta-data.

In accordance with the data conversion apparatus and method, instead of parsing the encoded elementary stream data itself, the meta-data associated with the elementary stream data is converted and the elementary stream data is converted in accordance with the meta-data having been converted. Accordingly, the normal play data can be efficiently converted into the trick play data.

The present invention, in still another aspect thereof, provides a data distribution system. The data distribution system includes a data distribution apparatus for distributing data; and a receiving terminal, connected to the data distribution apparatus via a communications line, for receiving data from the data distribution apparatus. The data distribution apparatus includes a request input unit for inputting a trick play request by a user; an encoding unit for externally inputting a source signal, coding the source signal into elementary stream data, and generating meta-data associated with the elementary stream data; a data storage unit for storing the elementary stream data and the meta-data generated by the encoding unit; a meta-data conversion unit for reading from the data storage unit meta-data in accordance with the trick play request input from the request input unit, and converting the meta-data in accordance with a type of trick play specified in the trick play request; an elementary stream data conversion unit for reading from the data storage means elementary stream data in accordance with the meta-data having been converted by said meta-data conversion means, and converting the elementary stream data into trick play data in accordance with the meta-data; and a transmitter unit for transmitting the trick play data generated by the elementary stream data conversion unit to the receiving terminal. The receiving terminal includes a receiver unit for receiving the trick play data from the transmitter unit in accordance with the trick play request; and a decoding unit for decoding the trick play data received by the receiver unit.

In accordance with the data distribution system, in generating the trick play data to be transmitted from the data distribution apparatus to the receiving terminal, instead of parsing the encoded elementary stream data itself, the meta-data associated with the elementary stream data is converted and the elementary stream data is converted in accordance with the meta-data having been converted. Accordingly, the normal play data can be efficiently converted into the trick play data.

BRIEF DESCRIPTION OF THE DRAWINGS

FIG. 4 is a table showing the access unit information of normal play data;

FIG. 5 is a table showing the access unit information of trick play data;

FIG. 7 shows conversion of access unit information when a pause is performed, in which (a) shows the access unit information before the conversion and (b) shows the access unit information after the conversion;

FIG. 10 shows conversion of access unit information when a slow play is performed, in which (a) shows the access unit information before the conversion and (b) shows the access unit information after the conversion;

FIG. 11 shows conversion of access unit information when a step play is performed, in which (a) shows the access unit information before the conversion and (b) shows the access unit information after the conversion;

DESCRIPTION OF THE PREFERRED EMBODIMENTS

Embodiments of the present invention will be described below with reference to the accompanying drawings.

Figure 1:
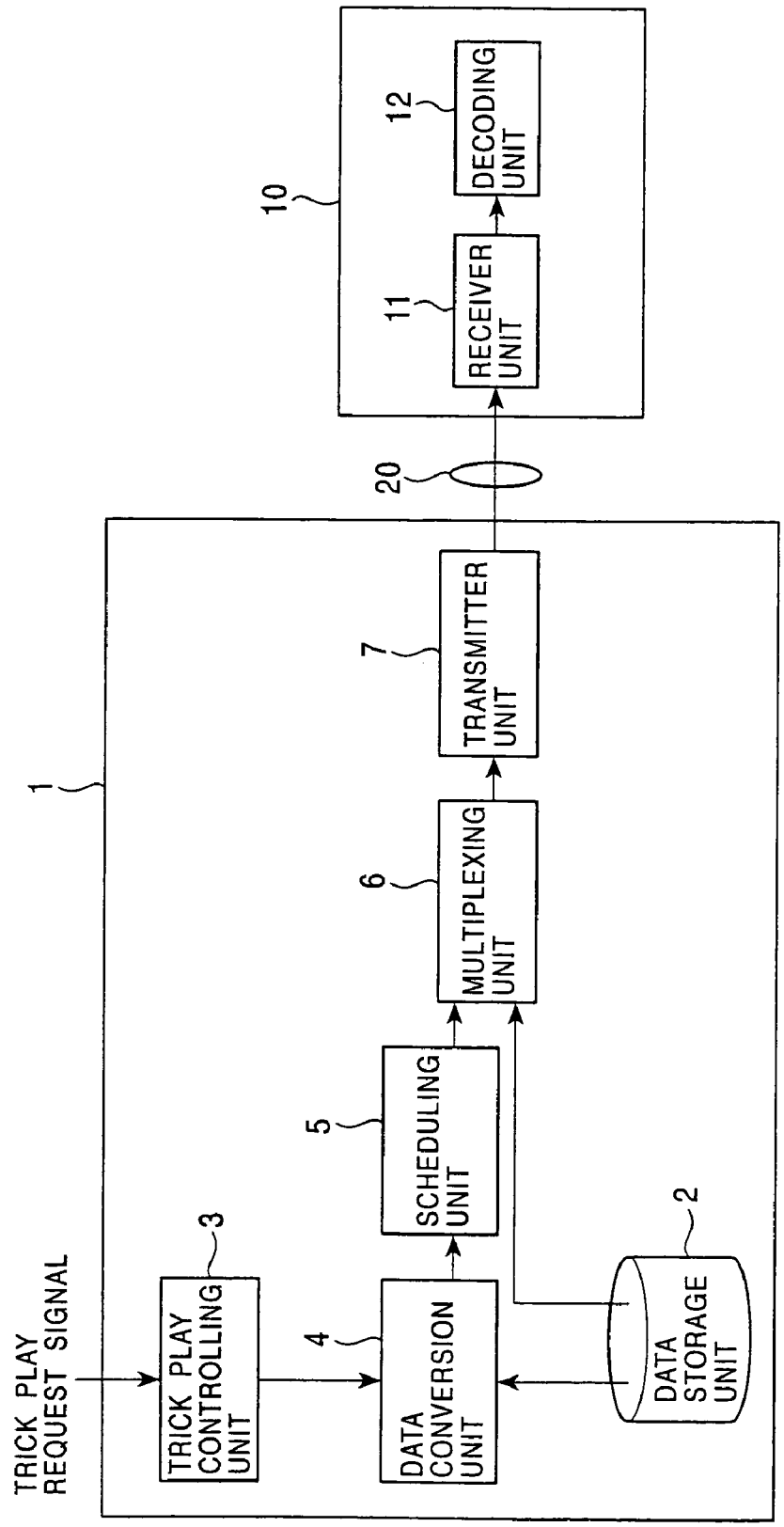
FIG. 1 is a block diagram showing the constructions of a server apparatus and a decoding terminal in a data distribution system according to an embodiment of the present invention.

The present invention is applied, for example, to a data distribution system as shown in FIG. 1.

The data distribution system includes a server apparatus 1 which distributes data stored therein, and a decoding terminal 10 which is connected to the server apparatus 1 via a transmission medium 20.

The server apparatus 1 includes a data storage unit 2 for storing elementary stream data and meta-data associated therewith, a trick play controlling unit 3, a data conversion unit 4, a scheduling unit 5, a multiplexing unit 6, and a transmitter unit 7.

The data storage unit 2 stores elementary stream data to be transmitted from the server apparatus 1 to the decoding terminal 10 via the transmission medium 20. The data storage unit 2 reads elementary stream data in accordance with a request from the data conversion unit 4, and outputs the elementary stream data to the multiplexing unit 6.

Furthermore, the data storage unit 2 reads meta-data in accordance with a trick play request from the data conversion unit 4, and outputs the meta-data to the data conversion unit 4.

In this example, the description will be made in the context that elementary streams only for video data are stored in the data storage unit 2; however, the data storage unit 2 may store multimedia data including, for example, still picture data, audio data, text data, and graphic data.

The trick play controlling unit 3 receives input of a trick play request signal with which the user requests a trick play. The trick play request signal input to the trick play controlling unit 3 includes information regarding the type of trick play, for example, a fast-forward play or a step play, and designation of particular video data stored in the data storage unit 2. In accordance with the trick play request signal, the trick play controlling unit 3 outputs a trick play control signal, including the type of trick play and the designation of video data, to the data conversion unit 4.

In accordance with the trick play control signal, the data conversion unit 4 reads meta-data associated with the designated video data from the data storage unit 2, and converts the meta-data in accordance with the type of trick play specified. More specifically, the data conversion unit 4 reads the meta-data associated with the designated elementary streams from the data storage unit 2, and converts the meta-data into meta-data for the trick play. The data conversion unit 4 outputs the meta-data for the trick play to the scheduling unit 5.

The scheduling unit 5 determines a multiplexing schedule with reference to the meta-data for the trick play input from the data conversion unit 4. More specifically, the scheduling unit 5 determines the multiplexing schedule using the meta-data for the trick play, by performing the processing disclosed in Japanese Unexamined Patent Application Publication No. 9-162830. The scheduling unit 5 outputs multiplexing schedule information, indicating the multiplexing schedule, to the multiplexing unit 6.

The multiplexing unit 6 multiplexes the elementary stream data read from the data storage unit 2 based on the multiplexing schedule information input from the scheduling unit 5, and outputs the multiplexed data to the transmitter unit 7.

The transmitter unit 7 converts the multiplexed data input from the multiplexing unit 6 into a format which allows transmission via the transmission medium 20, and transmits the data to the decoding terminal 10 via the transmission medium 20.

The decoding terminal 10 includes a receiver unit 11, which is connected to the server apparatus 1 via the transmission medium 20, and a decoding unit 12.

The receiver unit 11 receives the data transmitted from the transmitter unit 7 of the server apparatus 1 via the transmission medium 20. The receiver unit 11 converts the received data into a format which allows processing in the subsequent decoding unit 12, and outputs the data to the decoding unit 12 as trick play video data.

The decoding unit 12 decodes the trick play video data input from the receiver unit 11, thereby displaying the content of the trick play video data on a display apparatus (not shown).

Next, the meta-data will be described.

The meta-data stored in the data storage unit 2 of the server apparatus 1 includes, for example, access unit information. The access unit information concerns access units in the elementary streams, and is required for data conversion and scheduling of multiplexing when trick play is involved.

As an example, the operation of the server apparatus 1 will be described in the context of a jump play of video elementary streams coded in accordance with ISO/IEC 13818-2. A jump play is a type of trick play in which the play jumps from a current video frame to a particular video frame and is then continued.

Figure 2:
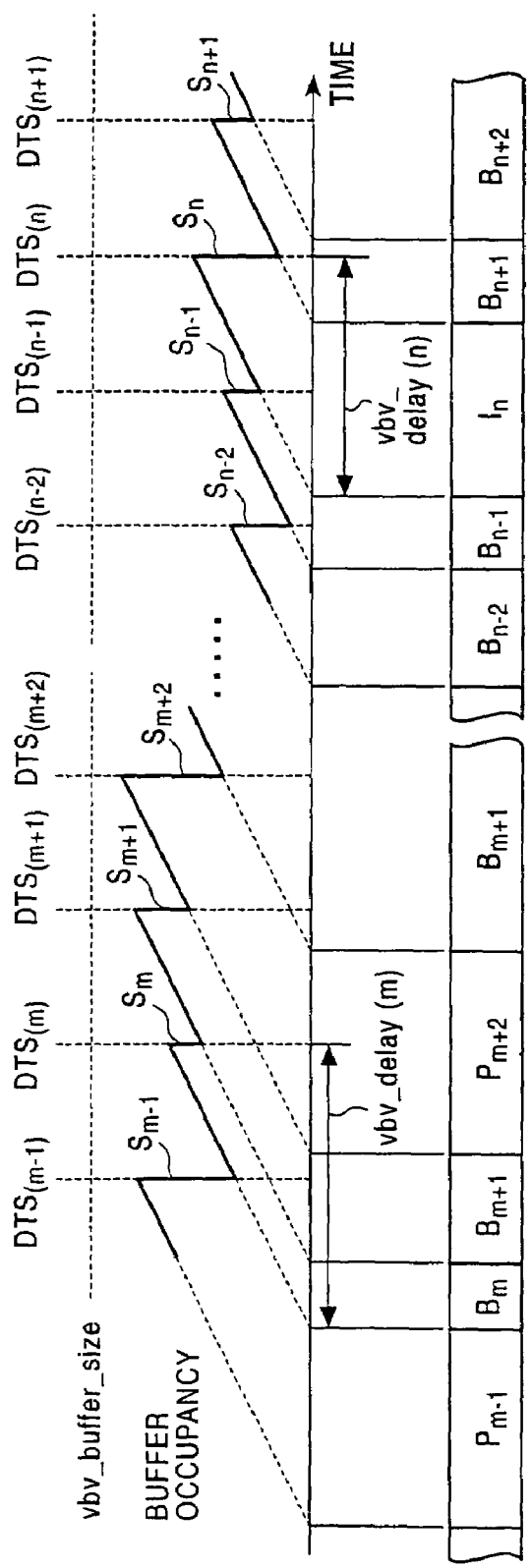
FIG. 2 is a diagram showing the relationship between normal play data and the occupancy of a VBV buffer.
Figure 3:
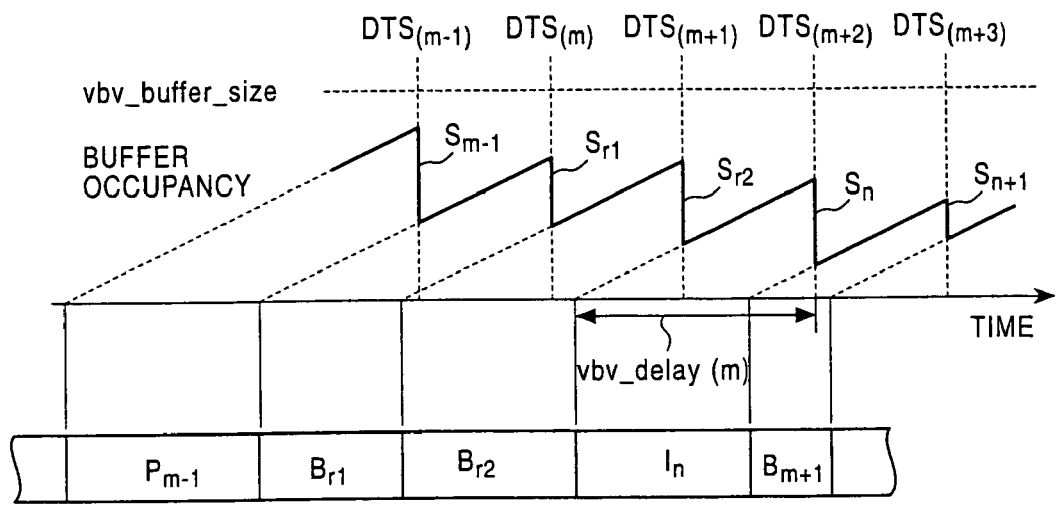
FIG. 3 is a diagram showing the relationship between trick play data and the occupancy of a VBV buffer.

FIG. 2 shows the relationship between video data for normal play, which will be converted for the trick play, and changes in the occupancy of the VBV buffer. FIG. 3 shows the relationship between video data for the trick play and changes in the buffer occupancy of the VBV buffer when the jump play is performed. FIGS. 2 and 3 deal with an example in which the play jumps from an access unit (m−1) of a P picture to an access unit (n) of an I picture.

If the multiplexing unit 6 allocates the access unit (n) immediately after the access unit (m−1), there occurs a mismatch in the occupancy of the VBV buffer, causing a VBV buffer error and thus failing to produce the appropriate MPEG-2 video data. Another problem is that the presentation time of the access unit (m−1), which should be equal to the decoding time DTS(m+2), changes to the decoding time DTS (m) of the access unit (n) after conversion. That is, when the video data is multiplexed into MPEG-2 TS by the multiplexing unit 6, there occurs a mismatch in the presentation time coded in the PES packet header.

Accordingly, when multiplexing the video data, the multiplexing unit 6 inserts repeat pictures $B_{r1}$ and $Br_2$ between the access unit (m−1) and the access unit (n), as shown in FIG. 3, so that the presentation time of the access unit (m−1) is maintained and a mismatch in the occupancy of the VBV buffer is prevented.

The data conversion unit 4 of the server apparatus 1, shown in FIG. 1, converts the normal play data, shown in FIG. 2, only with an input of access unit information, without an input of the elementary streams. More specifically, the data conversion unit 4 supplies the normal play data stored in the data storage unit 2 to the multiplexing unit 6 while reading access unit information of the normal play data to be converted for the trick play.

When the jump play described above is performed, the data conversion unit 4 reads access unit information of normal play data from the data storage unit 2, as shown in FIG. 4, and converts the access unit information of the normal play data into access unit information of the trick play data, as shown in FIG. 5, and outputs the converted access unit information to the scheduling unit 5.

The access unit information includes data size, decoding time, presentation time, and storage location in the data storage unit 2, for each of the access units. If the elementary streams stored in the data storage unit 2 are video data, the access unit information further includes information regarding the occupancy of the VBV buffer (VBV delay), picture type indicating the type of predictive coding, and a closed GOP (group of pictures) flag indicating whether random access is allowed.

In the case of video data in accordance with MPEG-4, the presentation time of a B picture is equal to its decoding time, while the presentation time of an I or P picture is equal to the decoding time of the next I or P picture. The presentation time and the decoding time may be substituted by picture coding type and an RFF (repeat fast field) flag and calculated therefrom.

The closed GOP flag is generated based on the storage location in the data storage unit 2. The closed GOP flag indicates whether a picture uses a preceding picture for prediction. That is, the closed GOP flag indicates whether an accurate decoding of a subsequent picture is possible even if the preceding picture is changed due to a trick play such as a jump play.

Based on the access unit information, the data conversion unit 4 determines the order of video data and the size and number of repeat pictures to be inserted for the data conversion for the trick play shown in FIGS. 2 and 3.

The data conversion unit 4 determines, based on the closed GOP flag, whether an accurate decoding of the data subsequent to the access unit (n) is possible even if the data preceding the access unit (n) is changed.

When the play jumps from the access unit (m−1) to the access unit (n), as shown in FIGS. 2 and 3, the data conversion unit 4 determines, based on the picture type included in the access unit information, the number of repeat pictures which must be inserted in order to maintain the presentation order of the access unit (m−1). In the example shown in FIG. 4, since two B pictures, i.e., the access unit (m) and the access unit (m+1), follow the access unit (m−1), the data conversion unit 4 determines that two repeat B pictures be inserted.

The data size of the repeat pictures can be uniquely determined based on the VBV delay values of the access unit (m) and the access unit (n) and the input rate of the video data.

Thus, the data conversion unit 4 inserts the access unit information of the repeat pictures into the access unit information shown in FIG. 4, thus creating the access unit information shown in FIG. 5.

Thus, in the server apparatus 1 including the data conversion unit 4 described above, the trick play data can be generated based on the access unit information which has been converted for the trick play, without parsing the elementary streams stored in the data storage unit 2. Accordingly, the processing load for the data conversion is considerably reduced.

Figure 16:
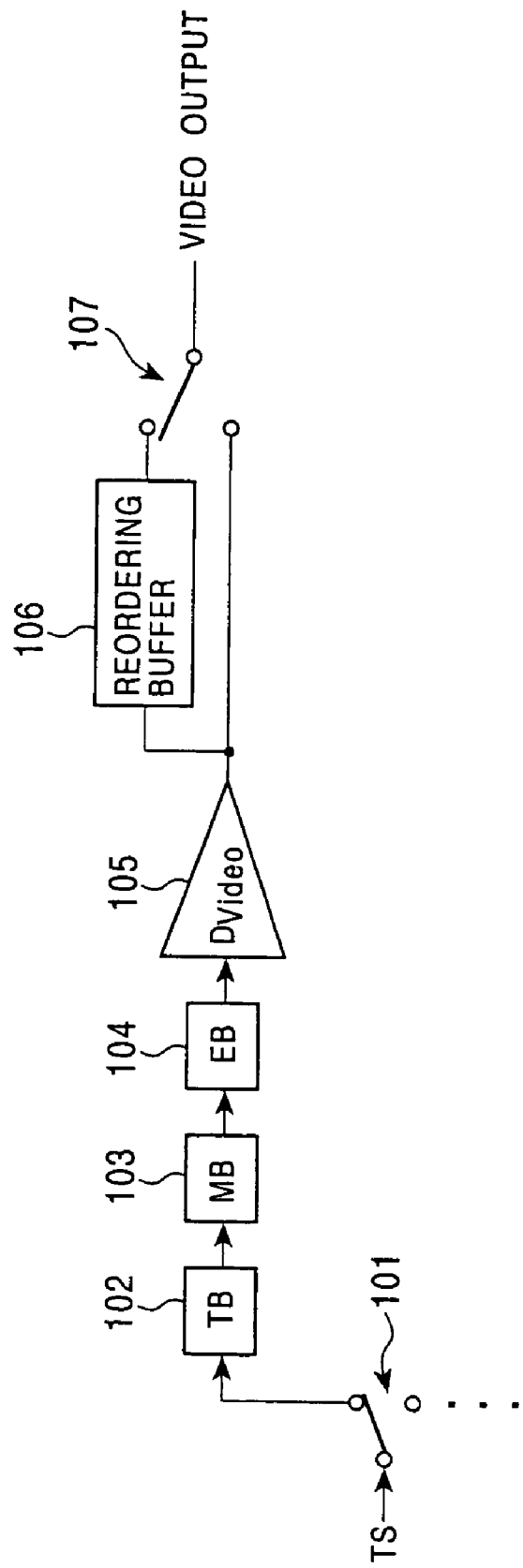
FIG. 16 is a block diagram of a decoder model for decoding transport streams in accordance with ISO/IEC 13818-1.
Figure 17:
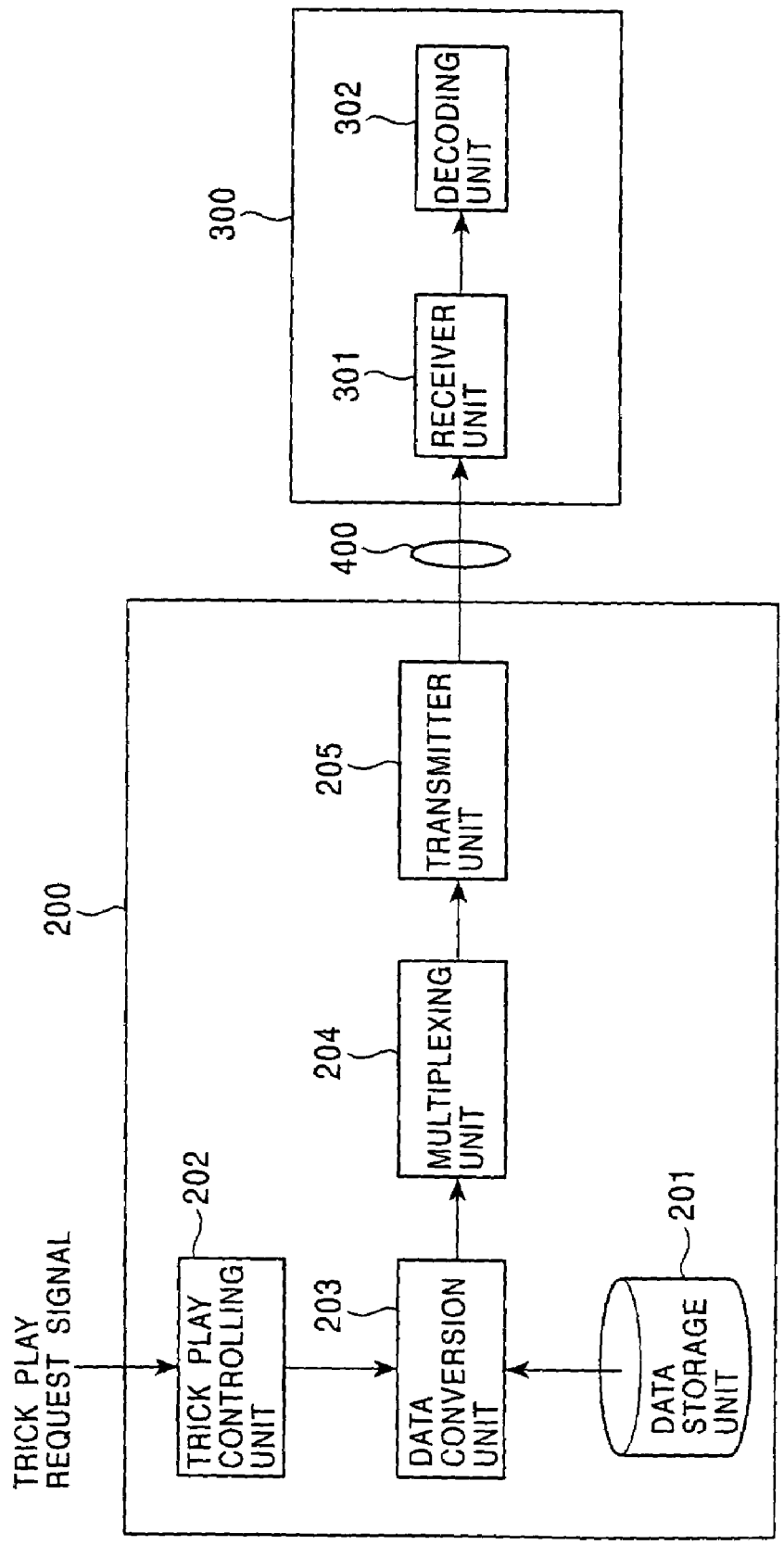
FIG. 17 is a block diagram of a conventional data distribution system.

The access unit information, which has been converted for the trick play as described above, is input to the scheduling unit 5, in which a multiplexing schedule is determined. If a plurality of elementary streams is to be multiplexed, the access unit information for all of the elementary streams is input to the scheduling unit 5. Based on the access unit information of the elementary streams, the scheduling unit 5 generates multiplexing schedule information which defines the order of packetization, lengths of packets, etc., with considerations to the decoder model shown in FIG. 16, the coding method of presentation time information and decoding time information, and alignment restrictions.

The multiplexing schedule information is an information packet for multiplexed data, and includes header information for packetization, designation of data to be multiplexed as the payload of a packet, and PSI (Program Specific Information).

The scheduling unit 5 is allowed to determine the multiplexing schedule without parsing the elementary streams themselves, the operation thereof being independent of whether the access unit information has been converted. Thus, the scheduling unit 5 considerably facilitates the processing for generating the trick play data.

Furthermore, with the access unit information having been converted for the trick play, the scheduling unit 5 is allowed to determine the schedule for multiplexing the elementary streams stored in the data storage unit 2 before conversion of the elementary streams themselves.

The multiplexing unit 6 selects data to be packetized from the data storage unit 2 based on the multiplexing schedule information generated by the scheduling unit 5, reads data of a length specified in the multiplexing schedule information, and adds a packet header in accordance with the multiplexing schedule information, thereby generating multiplexed data. Because the multiplexing schedule information has been generated based on the access unit information converted for the trick play, the multiplexed data generated by the multiplexing unit 6 reflects the conversion for the trick play.

The multiplexing unit 6 generates the multiplexed data with reference to the multiplexing schedule information, the operation thereof being independent of whether a trick play is to be performed. The trick play is made possible by the data conversion unit 4 which converts the meta-data associated with the elementary data streams. Thus, without any special trick play functionality of the transmission medium 20 for the data distribution, the decoding terminal 10 on the receiving end, and the receiver unit 11 and the decoding unit 12 of the decoding terminal 10, the server apparatus 1 is allowed to transmit the trick play data so that the contents of the data will be presented on the decoding terminal 10 in a trick mode.

Next, the operation of the data conversion unit 4, in relation to a trick play request signal which specifies a jump play as the type of trick play being input to the trick play controlling unit 3, will be described with reference to FIG. 6.

Figure 6:
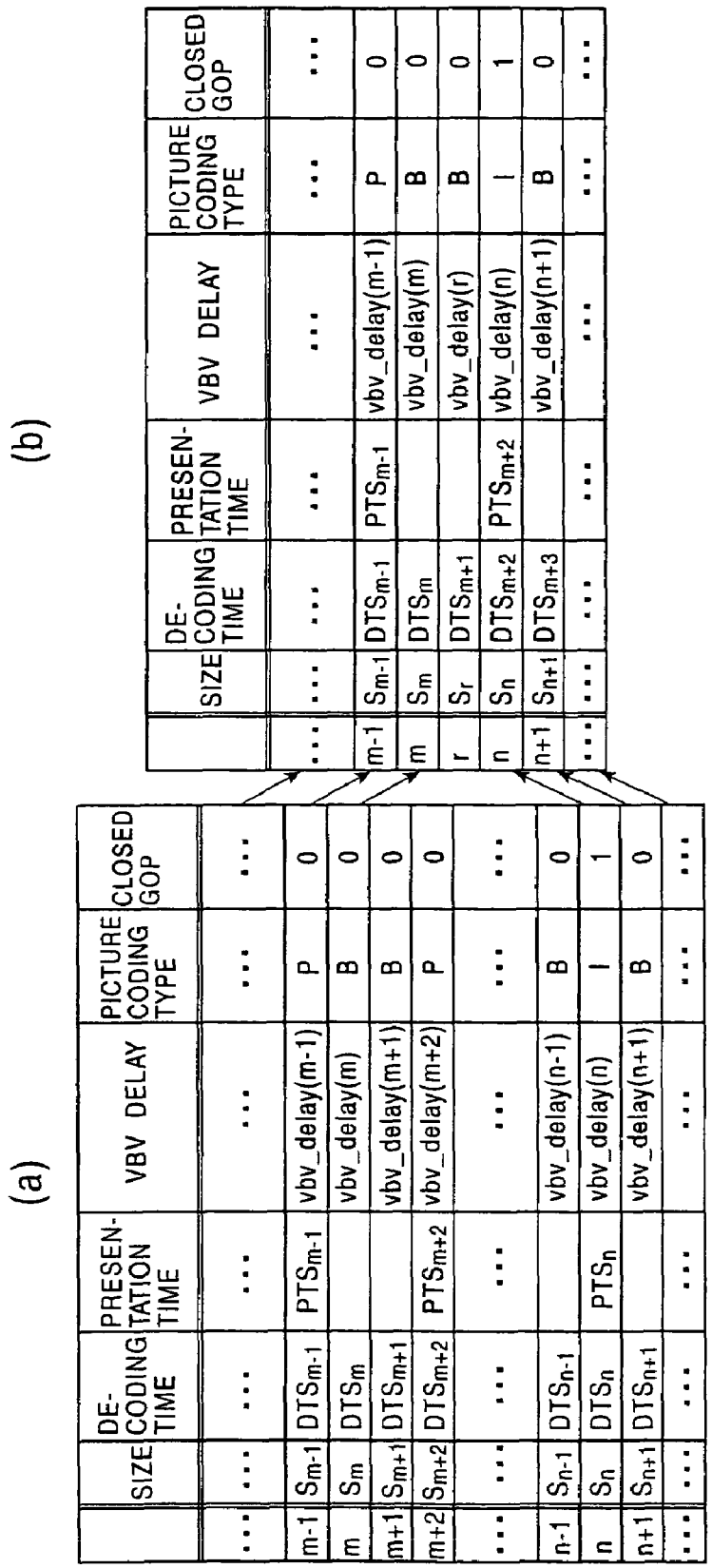
FIG. 6 shows conversion of access unit information when a jump play is performed, in which (a) shows the access unit information before the conversion and (b) shows the access unit information after the conversion.

Referring to FIG. 6, when a trick play control signal in accordance with the trick play request signal is received from the trick play controlling unit 3, the data conversion unit 4 reads the access unit information of normal play data specified by the trick play control signal from the data storage unit 2, as shown in (a).

Then, for example, if the trick play control signal specifies a jump from an access unit (m) to an access unit (n), the data conversion unit 4 deletes access unit information of data subsequent to the access unit (m) and prior to the access unit (n). Then, in order that trick play data be inserted with a repeat picture r between the access unit (m) and the access unit (n), the data conversion unit 4 inserts the access unit information of the repeat picture r, generating access unit information for the jump play, as shown in (b).

Next, the operation of the data conversion unit 4, in relation to a trick play request signal specifying a pause as the type of trick play being input to the trick play controlling unit 3, will be described with reference to FIG. 7.

Referring to FIG. 7, when a trick play control signal in accordance with the trick play request signal is received from the trick play controlling unit 3, the data conversion unit 4 reads the access unit information of normal play data included in the trick play control signal from the data storage unit 2, as shown in (a).

Then, for example, if the trick play control signal specifies a pause from the access unit (n) to the access unit (n+1), the trick play data requiring repeat pictures r1 to ri between the access unit (n) and the access unit (n+1), the data conversion unit 4 inserts the access unit information of the repeat pictures r1 to ri, thereby generating the access unit information for the pause, as shown in (b).

Next, the operation of the data conversion unit 4, in relation to a trick play request signal specifying a fast-forward play as the type of trick play being input to the trick play controlling unit 3, will be described with reference to FIG. 8.

Figure 8:
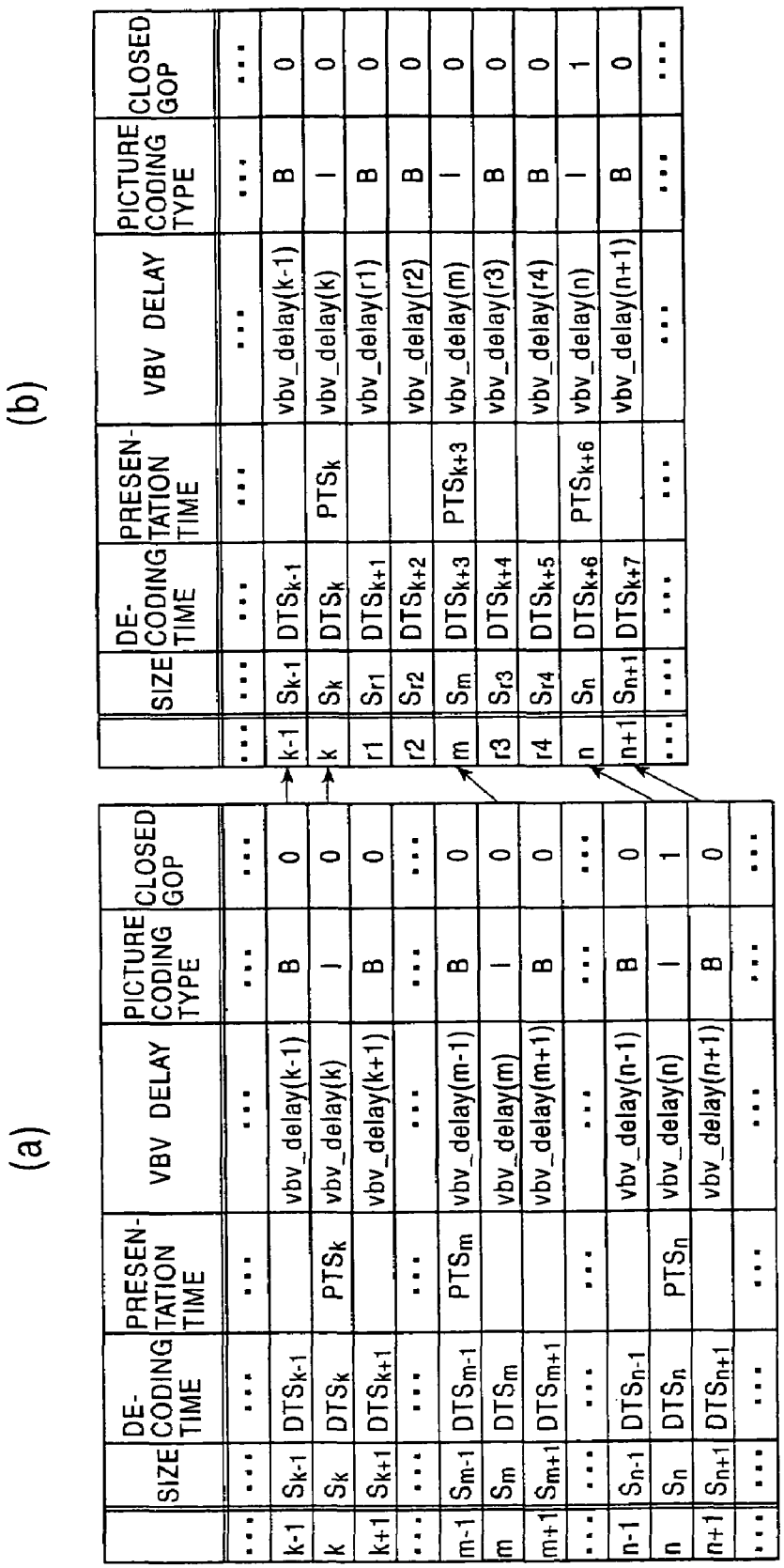
FIG. 8 shows conversion of access unit information when a fast-forward play is performed, in which (a) shows the access unit information before the conversion and (b) shows the access unit information after the conversion.

Referring to FIG. 8, when the trick play control signal in accordance with the trick play request signal is input from the trick play controlling unit 3, the data conversion unit 4 reads the access unit information of normal play data included in the trick play control signal from the data storage unit 2, as shown in (a).

Then, for example, if the trick play control signal specifies a fast-forward play from the access unit (k) to the access unit (n), the data conversion unit 4 selects access units to be played between the access unit (k) and the access unit (n), at a regular interval.

For example, if the access unit (m) is selected, the data conversion unit 4 replaces the access unit information of the access units (k+1) to (m−1) and the access units (m+1) to (n−1) with the access unit information of repeat pictures. More specifically, the data conversion unit 4 replaces the access unit information of the access units (k+1) to (m−1) with the access unit information of the repeat pictures r1 and r2, and replaces the access unit information of the access units (m+1) to (n−1) with the access unit information of the repeat pictures r3 and r4. The data conversion unit 4 thus generates the access unit information for the fast-forward play, as shown in (b).

Next, the operation of the data conversion unit 4, in relation to a trick play request signal specifying a reverse play as the type of trick play being input to the trick play controlling unit 3, will be described with reference to FIG. 9.

Figure 9:
FIG. 9 shows conversion of access unit information when a reverse play is performed, in which (a) shows the access unit information before the conversion and (b) shows the access unit information after the conversion.

Referring to FIG. 9, when a trick play control signal in accordance with the trick play request signal is input from the trick play controlling unit 3, the data conversion unit 4 reads the access unit information of normal play data included in the trick play control signal from the data storage unit 2, as shown in (a).

Then, for example, if the trick play control signal specifies a reverse play from the access unit (n) to the access unit (k), the data conversion unit 4 selects access units to be played between the access unit (k) and the access unit (n), at a regular interval.

For example, if the access unit (m) is selected, the data conversion unit 4 replaces the access unit information of the access units (k+1) to (m−1) and the access units (m+1) to (n−1) with access unit information of repeat pictures. More specifically, the data conversion unit 4 replaces the access unit information of the access units (k+1) to (m−1) with the access unit information of the repeat pictures r1 and r2, and replaces the access unit information of the access units (m+1) to (n−1) with the access unit information of the repeat pictures r3 and r4.

Furthermore, the data conversion unit 4 reorders the access unit information in the following order: the access unit information of the access unit (n) with which the reverse play starts; the access unit information of the repeat picture r1; the access unit information of the repeat picture r2; the access unit information of the access unit (m); the access unit information of the repeat picture r3; the access unit information of the repeat picture r4; and the access unit information of the access unit (k). The data conversion unit 4 thus generates the access unit information for the reverse play, as shown in (b).

Next, the operation of the data conversion unit 4, in relation to a trick play request signal specifying a slow play as the type of trick play being input to the trick play controlling unit 3, will be described with reference to FIG. 10.

Referring to FIG. 10, when the trick play control signal in accordance with a trick play request signal is input from the trick play controlling unit 3, the data conversion unit 4 reads the access unit information of normal play data included in the trick play control signal from the data storage unit 2, as shown in (a).

Then, for example, if the trick play control signal specifies a slow play from the access unit (m−1) to the access unit (m+2), the data conversion unit 4 inserts repeat pictures r1, r2, and r3 of the same size, between the access unit (m−1) and the access unit (m), between the access unit (m) and the access unit (m+1), and between the access unit (m+1) and the access unit (m+2), respectively. The data conversion unit 4 thus generates the access unit information for the slow play, as shown in (b).

The data conversion unit 4 changes the presentation time of each of the access units of video data in accordance with the number of the access units of the repeat pictures inserted between the access units. In this example, the data conversion unit 4 changes the presentation time of the access unit (m−1) to be equal to the decoding time of the access unit (m+2).

Next, the operation of the data conversion unit 4, in relation to a trick play request signal specifying a step play as the type of trick play being input to the trick play controlling unit 3, will be described with reference to FIG. 11.

Referring to FIG. 11, when a trick play control signal in accordance with the trick play request signal is input from the trick play controlling unit 3, the data conversion unit 4 reads the access unit information of normal play data included in the trick play control signal from the data storage unit 2, as shown in (a).

Then, for example, if the trick play control signal specifies a step play from the access unit (m−1) to the access unit (m+5), the data conversion unit 4 selects access units to be played between the access unit (m−1) and the access unit (m+5), at a regular interval.

For example, if the access unit (m+2) is selected, the data conversion unit 4 replaces the access unit information of the access units (m) and (m+1) and the access units (m+3) and (m+4) with access unit information of repeat pictures. More specifically, the data conversion unit 4 replaces the access unit information of the access units (m) and (m+1) with the access unit information of the repeat pictures r1 and r2, and replaces the access unit information of the access units (m+3) and (m+4) with the access unit information of the repeat pictures r3 and r4. The data conversion unit 4 thus generates the access unit information for the step play, as shown in (b).

Furthermore, the data conversion unit 4 sets the same presentation time for the access unit (m−1), the repeat picture r1, and the repeat picture r2, and also sets the same presentation time for the access unit (m+2), the repeat picture r3, and the repeat picture r4. Furthermore, the data conversion unit 4 sets the decoding time for each of the repeat pictures r1, r2, r3, and r4 to the decoding time for each of the access units (m), (m+1), (m+3), and (m+4), respectively.

Figure 12:
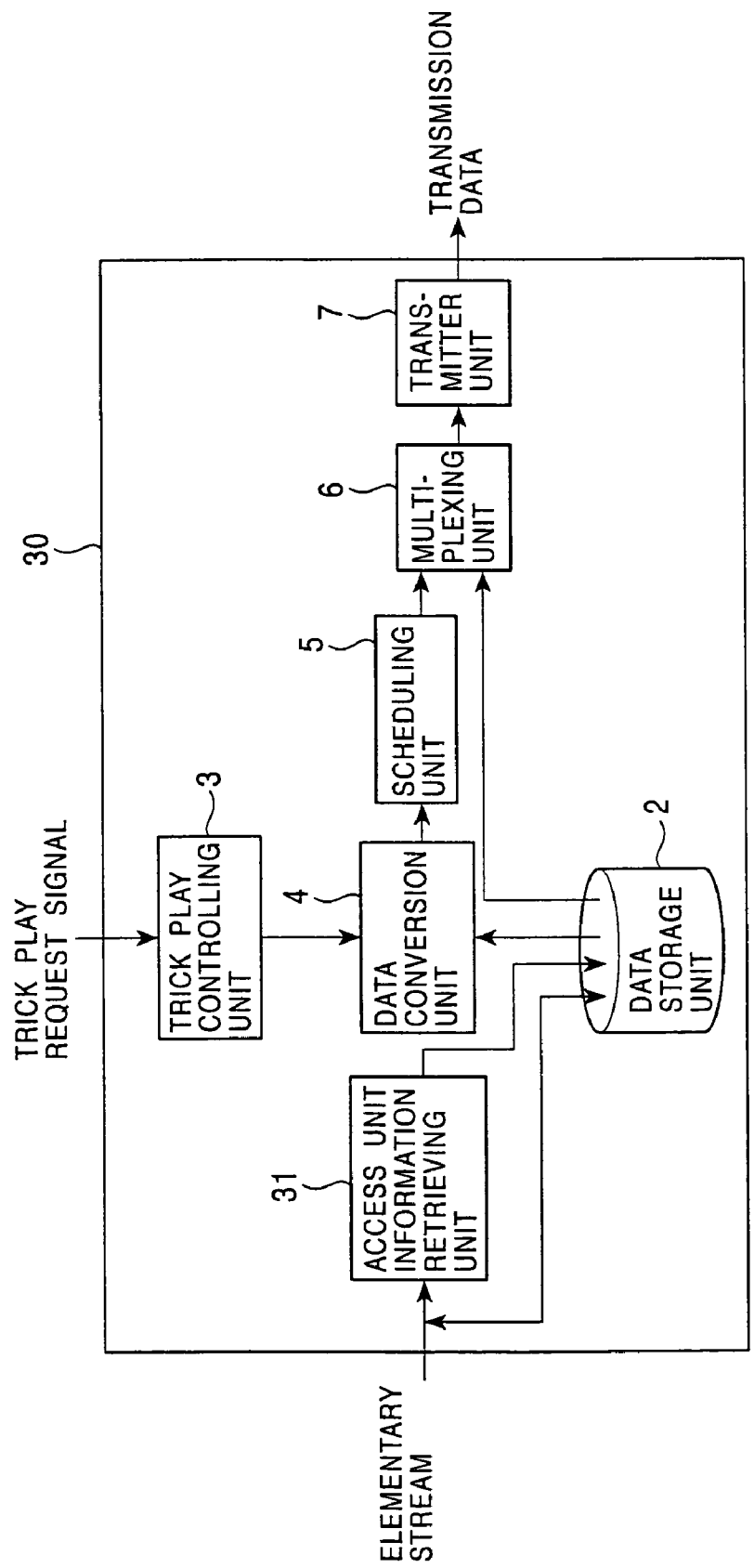
FIG. 12 is a block diagram of a server apparatus according to another embodiment of the present invention.

Next, the construction of a server apparatus 30 according to another embodiment of the present invention will be described with reference to FIG. 12. The components which are identical to those in the server apparatus 1 described above are indicated by the same reference numbers, and descriptions thereof will be omitted.

The server apparatus 30 differs from the server apparatus 1 in that an access unit information retrieving unit 31 is included.

The access unit information retrieving unit 31 retrieves the access unit information, described hereinabove, from the elementary stream data which has been input. For example, if video data in accordance with MPEG-2 is input, the access unit information retrieving unit 31 detects a unique picture start code at the beginning of a picture header, thereby detecting the data size of the picture, i.e., the access unit. Furthermore, the access unit information retrieving unit 31 retrieves the picture coding type, the VBV delay, and the RFF flag in the picture header, thereby generating presentation time information and decoding time information to be included in access unit information. The access unit information retrieving unit 31 also retrieves the closed GOP flag in the GOP header.

The data storage unit 2 stores the access unit information retrieved by the access unit information retrieving unit 31 and the elementary stream data which has been externally input. The data storage unit 2 stores the storage location of each of the access units of the elementary stream data as part of the access unit information thereof.

In accordance with the server apparatus 30, the access unit information to be input to the data conversion unit 4 and the scheduling unit 5 can be generated for elementary stream data which is newly input, allowing different combinations of the elementary stream data in accordance with the type of trick play. Furthermore, similarly to the server apparatus 1, the server apparatus 30 eliminates the need of parsing the elementary stream data itself in order to convert the elementary stream data for the trick play.

The server apparatus 30 may be allowed to receive an input of multiplexed data as well as an input of elementary stream data. When the server apparatus 30 receives the input of multiplexed data, if presentation time information and decoding time information is included in the PES packet header, the server apparatus retrieves the encoded values as the access unit information and stores the access unit information in the data storage unit 2.

Figure 13:
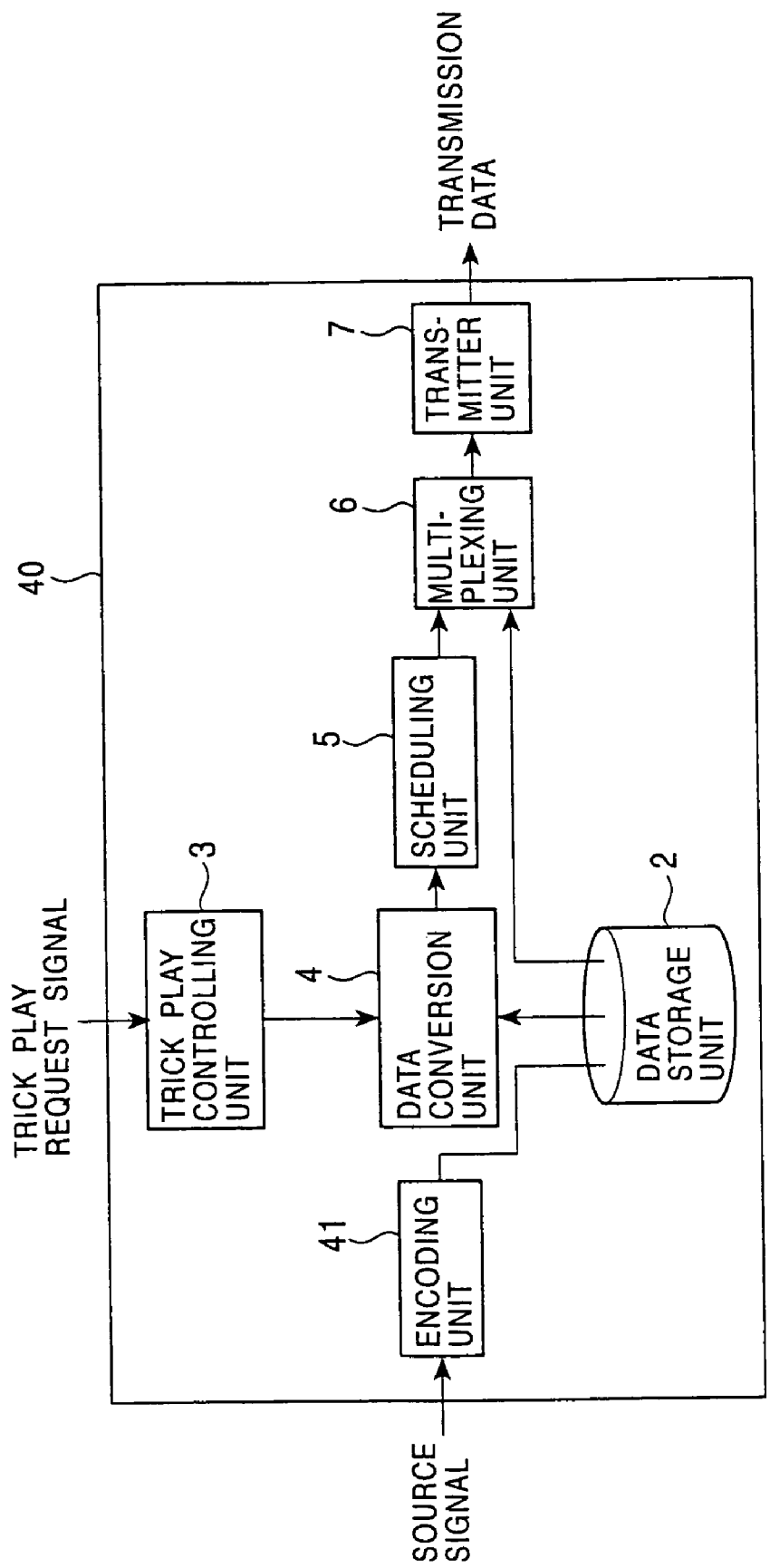
FIG. 13 is a block diagram of a server apparatus according to yet another embodiment of the present invention.
Figure 14:
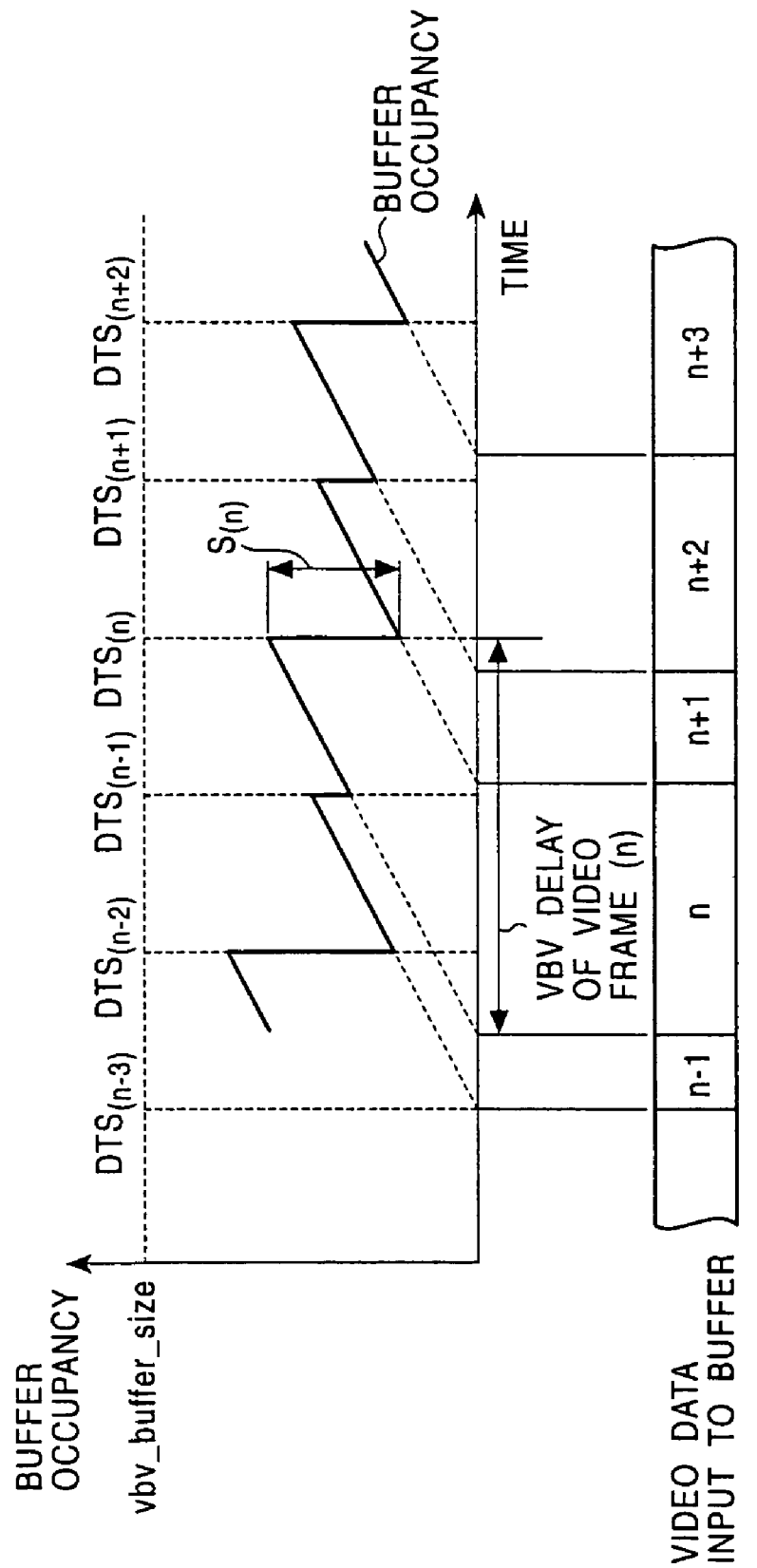
FIG. 14 is a diagram showing the relationship between video data and a VBV buffer.
Figure 15:
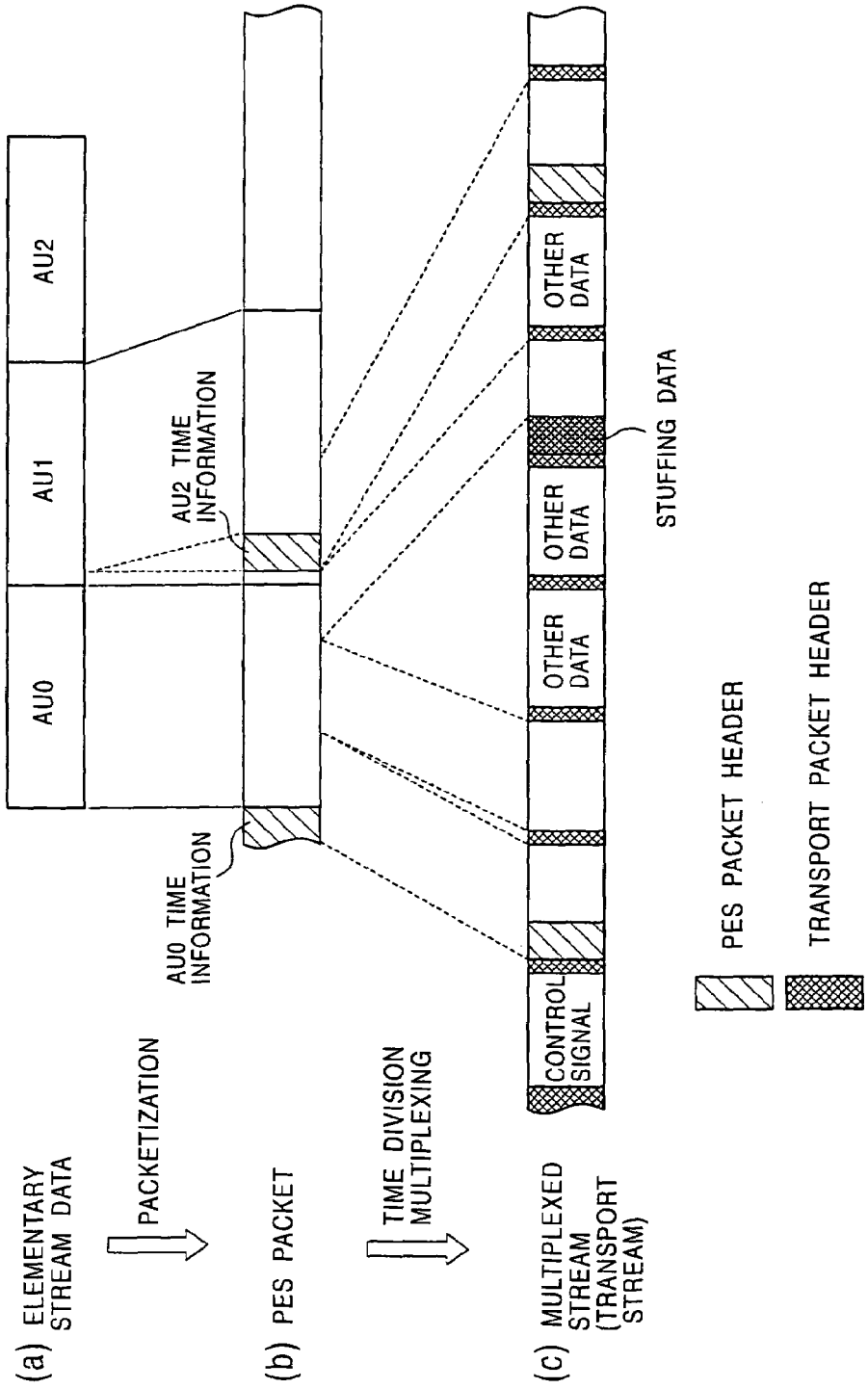
FIG. 15 is a diagram showing how elementary stream data is multiplexed.

Next, the construction of a server apparatus 40 according to yet another embodiment of the present invention will be described with reference to FIG. 13. The components which are identical to those in the server apparatus 1 described above are indicated by the same reference numbers, and descriptions thereof will be omitted.

The server apparatus 40 differs from the server apparatus 1 in that an encoding unit 41 for encoding a The encoding unit 41 encodes the source signal which has been input to generate the access unit information together with elementary stream data, and outputs the elementary stream data and the access unit information to the data storage unit 2.

For example, when a video source signal is encoded into MPEG-2 video elementary stream data, the encoding unit 41 generates the access unit information and outputs the access unit information to the data storage unit 2.

In accordance with the server apparatus 40, the access unit information to be used in the data conversion unit 4 and the scheduling unit 5 can be generated. Furthermore, the encoding unit 41 outputs the access unit information to the data storage unit 2, eliminating the need of retrieving the access unit information, and thus allowing the multiplexing of the elementary stream data a plural number of times by different combinations without parsing the elementary stream data each time.

What is claimed is:

1. A data conversion apparatus comprising:
    input means for inputting a trick play request by a user;
    data storage means for storing normal play stream data and access unit information for normal play; wherein
    the access unit information comprises data size information, decoding time information presentation time information and storage location information, for each predetermined processing unit of the stream data;
    data conversion means for reading, from said data storage means, the access unit information for normal play in accordance with the trick play request input from said input means, and converting the access unit information for normal play into access unit information for the trick play in accordance with a type of trick play specified in the trick play request; and
    scheduling means for generating, based on the access unit information converted for the trick play, schedule information for multiplexing stream data converted for the trick play; and
    multiplexing means for selecting the stream data to be packetized from the data storage means based on the schedule information and reading data of a length specified in the schedule information and adding a packet header in accordance with the schedule information and generating the stream data converted for the trick play;
    wherein said data storage means stores, as the access unit information, data size information, decoding time information, presentation time information, occupancy information of an imaginary buffer for controlling the amount of codes being generated, coding type information indicating a type of coding, and a closed GOP flag, for each predetermined processing unit of the transmission data.

2. A data conversion method for converting access unit information, comprising the steps of:
    inputting a trick play request from a user;
    storing normal play stream data and access unit information in a data storage means;
    reading, from the data storage means access unit information for normal play, in accordance with the trick play request, and
    converting the access unit information for normal play into access unit information for a trick play in accordance with a type of trick play specified in the trick play request;
    generating a schedule for multiplexing stream data into the trick play data, based on the access unit information for the trick play; and
    selecting the stream data to be packetized from the data storage means, using a multiplexing means, based on the schedule information and reading data of a length specified in the schedule information and adding a packet header in accordance with the schedule information and generating the stream data converted for the trick play;
    wherein the access unit information comprises data size information, decoding time information presentation time information, occupancy information of an imaginary buffer for controlling the amount of codes being generated, coding type information indicating a type of coding, and a closed GOP flag, for each predetermined processing unit of the stream data.

3. A data conversion apparatus for converting access unit information, the data conversion apparatus comprising:
    request input means for inputting a trick play request by a user;
    data input means for externally inputting elementary stream data;
    data retrieving means for retrieving, from the elementary stream data input from said data input means, access unit information for normal play, associated with the elementary stream data;
    data storage means for storing stream data for normal play and said access unit information for normal play, retrieved by said data retrieving means;
    data conversion means for reading from said data storage means the access unit information for normal play in accordance with the trick play request input from said request input means, and
    converting the access unit information for normal play into access unit information for a trick play in accordance with a type of trick play specified in the trick play request;
    scheduling means for generating, based on the access unit information for the trick play, schedule information for multiplexing stream data converted for the trick play; and
    multiplexing means for selecting the stream data to be packetized from the data storage means based on the schedule information and reading data of a length specified in the schedule information and adding a packet header in accordance with the schedule information and generating the stream data converted for the trick play;
    wherein the access unit information comprises data size information, decoding time information presentation time information and storage location information, for each predetermined processing unit of the stream data; and wherein said data retrieving means retrieves from the elementary stream data, as the access unit information, data size information, decoding time information, presentation time information, occupancy information of an imaginary buffer for controlling the amount of codes being generated, coding type information indicating a type of coding, and a closed GOP flag, for each predetermined processing unit of the elementary stream data.

4. A data conversion method for converting access unit information, comprising the steps of:

externally inputting elementary stream data, retrieving access unit information for normal play, associated with the elementary stream data from the elementary stream data, and storing the normal play stream data and the access unit information for normal play, in a data storage means;

wherein the access unit information comprises data size information, decoding time information presentation time information and storage location information, for each predetermined processing unit of the stream data;

in response to a trick play request input by a user, reading from said data storage means the access unit information for normal play in accordance with the trick play request, and converting the access unit information for normal play into access unit information for a trick play in accordance with a type of trick play specified in the trick play request;

generating a schedule for multiplexing stream data converted for the trick play, on the access unit information for the trick play; and selecting the stream data to be packetized from the data storage means, using a multiplexing means, based on the schedule information and reading data of a length specified in the schedule information and adding a packet header in accordance with the schedule information and generating the stream data converted for the trick play;

wherein data size information, decoding time information, presentation time information, occupancy information of an imaginary buffer for controlling the amount of codes being generated, coding type information indicating a type of coding, and a closed GOP flag is retrieved from the elementary stream data as the access unit information, for each predetermined processing unit of the elementary stream data.

5. A data conversion apparatus for converting access unit information, the data conversion apparatus comprising:

request input means for inputting a trick play request by a user;

encoding means for externally inputting a source signal, coding the source signal into an elementary stream data, and generating access unit information for normal play, associated with the elementary stream data;

data storage means for storing normal play stream data and said access unit information for normal play, generated by said encoding means;

data conversion means for reading from said data storage means the access unit information for normal play in accordance with the trick play request input from said request input means, and converting the access unit information for normal play into access unit information for a trick play in accordance with a type of trick play specified in the trick play request;

scheduling means for generating, based on the access unit information for the trick play, schedule information for multiplexing stream data converted for the trick play; and multiplexing means for selecting the stream data to be packetized from the data storage means based on the schedule information and reading data of a length specified in the schedule information and adding a packet header in accordance with the schedule information and generating the stream data converted for the trick play;

wherein the access unit information comprises data size information, decoding time information presentation time information and storage location information, for each predetermined processing unit of the stream data; and wherein said encoding means generates, as the access unit information, data size information, decoding time information, presentation time information, occupancy information of an imaginary buffer for controlling the amount of codes being generated, coding type information indicating a type of coding, and a closed GOP flag, for each predetermined processing unit of the elementary stream data.

6. A data conversion method for converting access unit information, comprising the steps of:

externally inputting a source signal, encoding the source signal into elementary stream data, generating access unit information for normal play, associated with the elementary stream data, and storing normal play stream data and said access unit information for normal play, in data storage means;

in response to a trick play request input by a user, reading from said data storage means the access unit information for normal play in accordance with the trick play request, and converting the access unit information for normal play into access unit information for a trick play in accordance with a type of trick play specified in the trick play request;

generating a schedule for multiplexing stream data converted into the trick play data, based on the access unit information for the trick play; and selecting the stream data to be packetized from the data storage means, using a multiplexing means, based on the schedule information and reading data of a length specified in the schedule information and adding a packet header in accordance with the schedule information and generating the stream data converted for the trick play;

wherein the access unit information comprises data size information, decoding time information presentation time information and storage location information, for each predetermined processing unit of the stream data; and wherein data size information, decoding time information, presentation time information, occupancy information of an imaginary buffer for controlling the amount of codes being generated, coding type information indicating a type of coding, and a closed GOP flag is generated as the access unit information, for each predetermined processing unit of the elementary stream data.

7. A data distribution system comprising:

a data distribution apparatus for distributing data; and a receiving terminal, connected to said data distribution apparatus via a communications line, for receiving data from said data distribution apparatus;

said data distribution apparatus comprising:

input means for inputting a trick play request by a user;

data storage means for storing normal play stream data and access unit information for normal play, associated with the transmission data;

data conversion means for reading from said data storage means the access unit information for normal play in accordance with the trick play request input from said input means, and converting the access unit information for normal play into access unit information for a trick play in accordance with a type of trick play specified in the trick play request;

scheduling means for generating, based on the access unit information for the trick play, schedule information for multiplexing stream data converted for the trick play;

multiplexing means for selecting the stream data to be packetized from the data storage means based on the schedule information and reading data of a length specified in the schedule information and adding a packet header in accordance with the schedule information and generating the stream data converted for the trick play wherein the access unit information comprises data size information, decoding time information presentation time information, occupancy information of an imaginary buffer for controlling the amount of codes being generated, coding type information indicating a type of coding, and a closed GOP flag, for each predetermined processing unit of the stream data;

said receiving terminal comprising:
  receiver means for receiving the trick play data from said transmitter means in accordance with the trick play request; and
  decoding means for decoding the trick play data received by said receiver means.

8. A data distribution system comprising:
a data distribution apparatus for distributing data; and
a receiving terminal, connected to said data distribution apparatus via a communications line, for receiving data from said data distribution apparatus;
said data distribution apparatus comprising:
  request input means for inputting a trick play request by a user;
  data input means for externally inputting elementary stream data;
  data retrieving means for retrieving, from the elementary stream data input from said data input means, access unit information for normal play, associated with the elementary stream data;
  data storage means for storing normal play stream data and said access unit information for normal play, retrieved by said data retrieving means;
  data conversion means for reading from said data storage means the access unit information for normal play in accordance with the trick play request input from said request input means, and converting the access unit information for normal play into access unit information for a trick play in accordance with a type of trick play specified in the trick play request;
  scheduling means for generating, based on the access unit information for the trick play, schedule information for multiplexing stream data converted for the trick play;
  multiplexing means for selecting the stream data to be packetized from the data storage means based on the schedule information and reading data of a length specified in the schedule information and adding a packet header in accordance with the schedule information and generating the stream data converted for the trick play;
  wherein the access unit information comprises data size information, decoding time information presentation time information , occupancy information of an imaginary buffer for controlling the amount of codes being generated, coding type information indicating a type of coding, and a closed GOP flag, for each predetermined processing unit of the stream data;
said receiving terminal comprising:
  receiver means for receiving the trick play data from said transmitter means in accordance with the trick play request; and
  decoding means for decoding the trick play data received by said receiver means.

9. A data distribution system comprising:
a data distribution apparatus for distributing data; and
a receiving terminal, connected to said data distribution apparatus via a communications line, for receiving data from said data distribution apparatus;
said data distribution apparatus comprising:
  request input means for inputting a trick play request by a user;
  encoding means for externally inputting a source signal, coding the source signal into elementary stream data, and generating access unit information for normal play, associated with the elementary stream data;
  data storage means for storing normal play stream data and said access unit information for normal play, generated by said encoding means;
  data conversion means for reading from said data storage means the access unit information for normal play in accordance with the trick play request input from said request input means, and converting the access unit information for normal play into access unit information for a trick play in accordance with a type of trick play specified in the trick play request;
  scheduling means for generating, based on the access unit information for the trick play, schedule information for multiplexing stream data converted for the trick play;
  multiplexing means for selecting the stream data to be packetized from the data storage means based on the schedule information and reading data of a length specified in the schedule information and adding a packet header in accordance with the schedule information and generating the stream data converted for the trick play;
  wherein the access unit information comprises data size information, decoding time information presentation time information, occupancy information of an imaginary buffer for controlling the amount of codes being generated, coding type information indicating a type of coding, and a closed GOP flag, for each predetermined processing unit of the stream data;
said receiving terminal comprising:
  receiver means for receiving the trick play data from said transmitter means in accordance with the trick play request; and
decoding means for decoding the trick play data received by said receiver means.

* * * * *